(12) United States Patent
Chien et al.

(10) Patent No.: US 7,717,262 B1
(45) Date of Patent: May 18, 2010

(54) COMPACT DISK BOX STRUCTURE

(75) Inventors: Colin Chien, Taipei (TW); Nick Lin, Taipei (TW); Jimmy Hsiao, Taipei (TW)

(73) Assignee: CMC Magnetics Corporation, Taipei (TW)

( * ) Notice: Subject to any disclaimer, the term of this patent is extended or adjusted under 35 U.S.C. 154(b) by 0 days.

(21) Appl. No.: 12/382,953

(22) Filed: Mar. 27, 2009

(51) Int. Cl.
*G11B 33/02* (2006.01)

(52) U.S. Cl. .................... 206/303; 206/308.1; 206/310; 206/445; 206/493

(58) Field of Classification Search .................. 206/303, 206/307, 308.1, 308.2, 309, 310, 445, 493, 206/407, 414, 446
See application file for complete search history.

(56) References Cited

U.S. PATENT DOCUMENTS

| | | | | |
|---|---|---|---|---|
| 4,784,263 | A * | 11/1988 | Stanley | 206/349 |
| 5,257,709 | A * | 11/1993 | Okabe et al. | 220/62.22 |
| 6,112,894 | A * | 9/2000 | Kikuchi et al. | 206/308.1 |
| 6,820,741 | B2 * | 11/2004 | Ferguson et al. | 206/310 |
| 6,915,898 | B2 * | 7/2005 | Becker et al. | 206/310 |
| 2001/0050239 | A1 * | 12/2001 | Ishii | 206/308.1 |
| 2004/0099548 | A1 * | 5/2004 | Ito et al. | 206/303 |
| 2006/0096881 | A1 * | 5/2006 | Ozaki et al. | 206/445 |
| 2008/0017533 | A1 * | 1/2008 | Hong | 206/307.1 |
| 2009/0026097 | A1 * | 1/2009 | Huang et al. | 206/308.2 |

* cited by examiner

*Primary Examiner*—Ehud Gartenberg
*Assistant Examiner*—Robert Poon
(74) *Attorney, Agent, or Firm*—Bacon & Thomas, PLLC (57) ABSTRACT

A compact disk (CD) box structure includes a seat having an upward extended central post, which has an externally threaded upper end; a knob having a downward extended and internally threaded hollow central column for screwing to the externally threaded upper end of the central post, so that CDs stacked on the seat around the central post can be immovably held to the seat by the knob; a protective barrel being a cylindrical container with a closed bottom and an open top, so that the seat having CDs stacked thereon can be fitly received in the protective barrel; and a top cover being connectable to a flange around the open top of the protective barrel by high-frequency heating or heat melting to seal the CDs in the protective barrel. The CDs stored in the CD box are not only well protected against dust, but also scratches possibly caused by vibration.

2 Claims, 8 Drawing Sheets

COMPACT DISK BOX STRUCTURE

FIELD OF THE INVENTION

The present invention relates to a compact disk (CD) box structure, and more particularly to a CD box structure that consists of a protective barrel and allows automated packaging and sealing of CDs in the protective barrel at reduced cost while achieves the function of protecting CDs against dust and undesirable scratches.

BACKGROUND OF THE INVENTION

Figure 1:
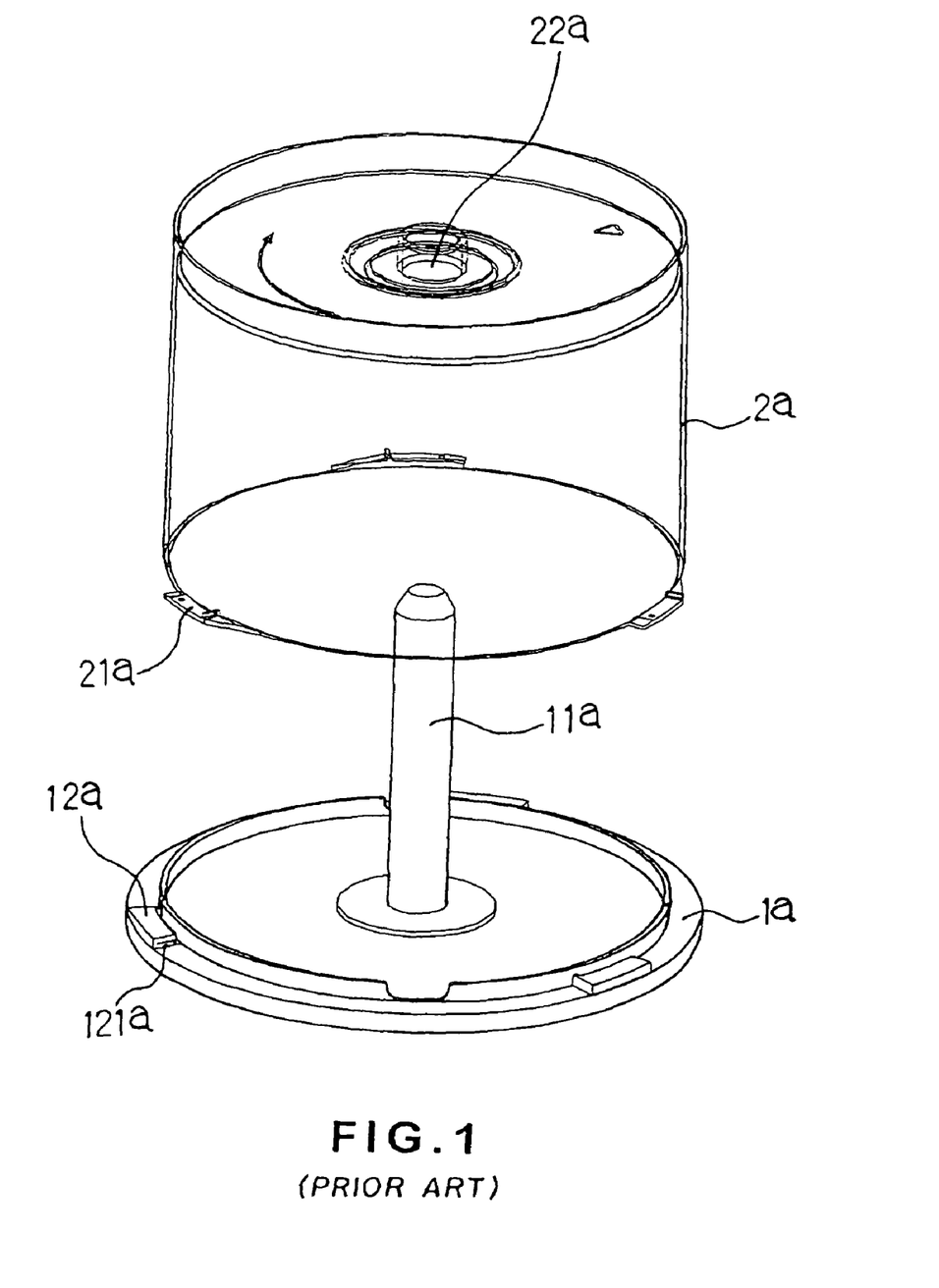
FIG. 1 is an exploded perspective view of a conventional CD box.
Figure 2:
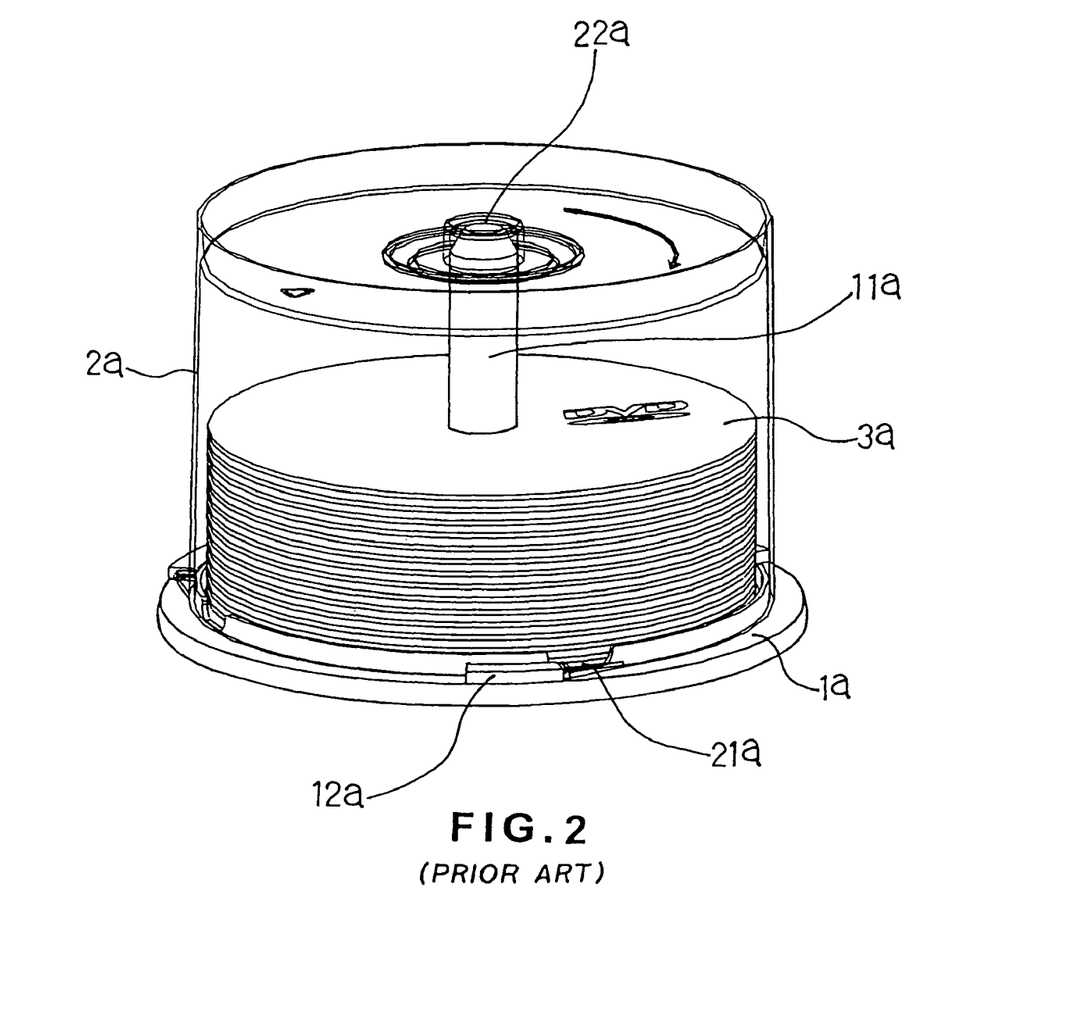
FIG. 2 is assembled view of the conventional CD box of FIG. 1 with a plurality of compact disks stored therein.

In FIGS. 1 and 2, there is shown a conventional compact disk (CD) box, which consists of a seat 1a and a top cover 2a. The top cover 2a is provided at a center with an upward projected hollow column 22a, which has in inner diameter just large enough for receiving an upper end of a central post 11a upward extended from a center of the seat 1a. The top cover 2a is provided along a lower rim with three equally spaced lugs 21a, and the seat 1a is correspondingly provided near and along an outer periphery thereof with three equally spaced retaining members 12a, each of which defines a retaining space 121a for receiving and engaging with one lug 21a, so that a plurality of CDs 3a can be stacked on the seat 1a around the central post 11a and the top cover 2a can be locked to the seat 1a via engagement of the lugs 21a with the retaining members 12a to thereby package and seal the CDs 3a in a box formed from the engaged seat 1a and top cover 2a. Since the top cover 2a could not be locked to the seat 1a through automated operation, a relatively higher cost is required to package and seal the CDs 3a in the conventional CD box. Meanwhile, the conventional CD box provides less ideal protection to the CDs 3a stored therein.

SUMMARY OF THE INVENTION

It is therefore a primary object of the present invention to provide an improved compact disk (CD) box structure that allows automated packaging and sealing of a plurality of CDs in the CD box at reduced cost.

Another object of the present invention is to provide an improved CD box structure that protects CDs stored therein against not only dust, but also undesirable scratches possibly caused by vibration.

To achieve the above and other objects, the CD box structure according to a preferred embodiment of the present invention includes a seat, a knob, a protective barrel, and a top cover. The seat has an upward extended central post with an externally threaded upper end. The knob has a downward extended and internally threaded hollow central column for screwing to the externally threaded upper end of the central post. The protective barrel is a cylindrical container having a closed bottom and an open top, and including a radially outward flange extended along the open top. The top cover can be connected to the flange around the open top of the protective barrel by heat melting. A plurality of CDs can be stacked on the seat around the central post, and be immovably held thereto when the knob is screwed to the upper end of the central post. The seat with CDs stacked thereon can be then fitly received in the protective barrel, and the open top of the protective barrel can be sealed with the top cover. With the above CD box structure, CDs stored in the CD box are protected against not only dust, but also undesirable scratches possibly caused by vibration.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Please refer to FIGS. 3 to 8. A compact disk (CD) box structure according to a preferred embodiment of the present invention is also commonly referred to as a CD pudding box, and includes a seat 1, a knob 2, a protective barrel, and a top cover 4.

Figure 3:
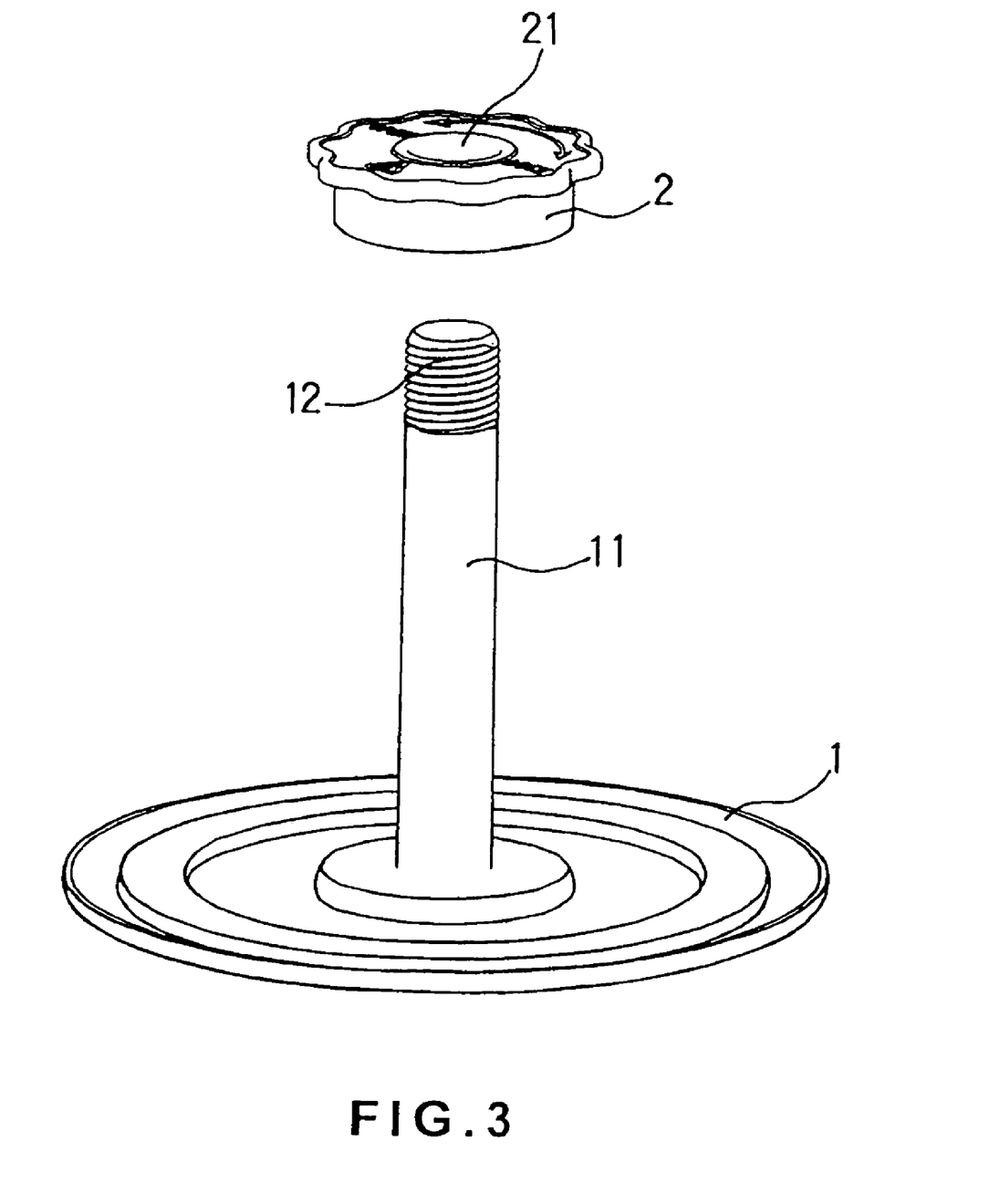
FIG. 3 is an exploded perspective view showing a seat and a knob included in the CD box structure of the present invention.

The seat 1 has an upward extended central post 11 for a plurality of CDs 5 to stack on the seat 1 around the central post 11. A predetermined section at an upper end of the central post 11 is provided with external threads 12.

The knob 2 is formed at a center with a downward extended hollow column 21, an inner wall surface of which is provided with internal threads 22 adapted to mesh with the external threads 12 at the upper end of the central post 11 on the seat 1. When the knob 2 is screwed to the upper end of the central post 11, the CDs 5 stacked on the seat 1 around the central post 11 are immovably held to the seat 1.

The protective barrel 3 is also commonly referred to as a blister, which is a cylindrical container having a closed bottom and an open top for receiving the seat 1 and the stacked CDs 5 therein. As can be seen from FIG. 5, a radially outward extended flange 31 is formed along the open top of the protective barrel 3.

Figure 7:
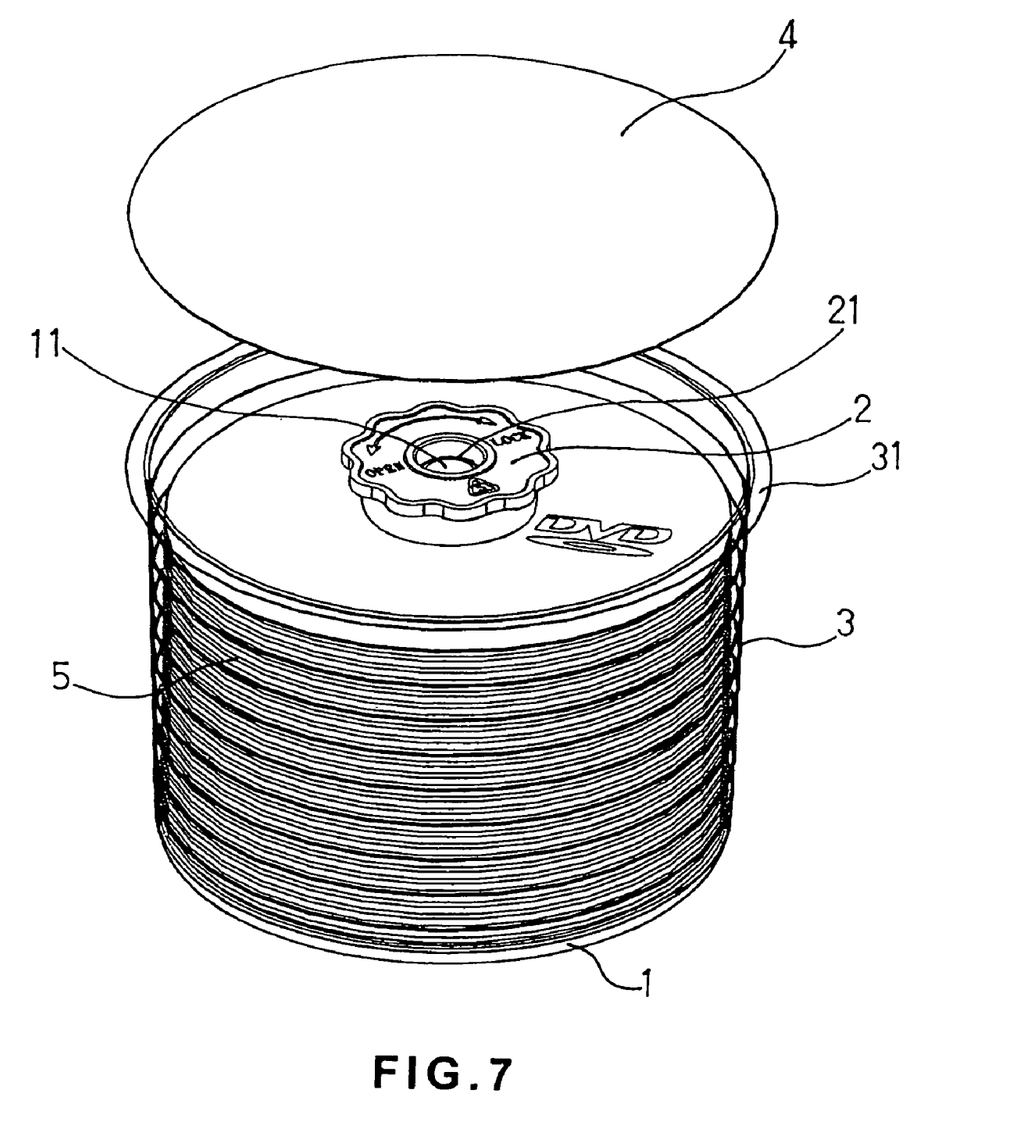
FIG. 7 shows the protective barrel with the seat and the stacked CDs received therein before being closed by a top cover.
Figure 8:
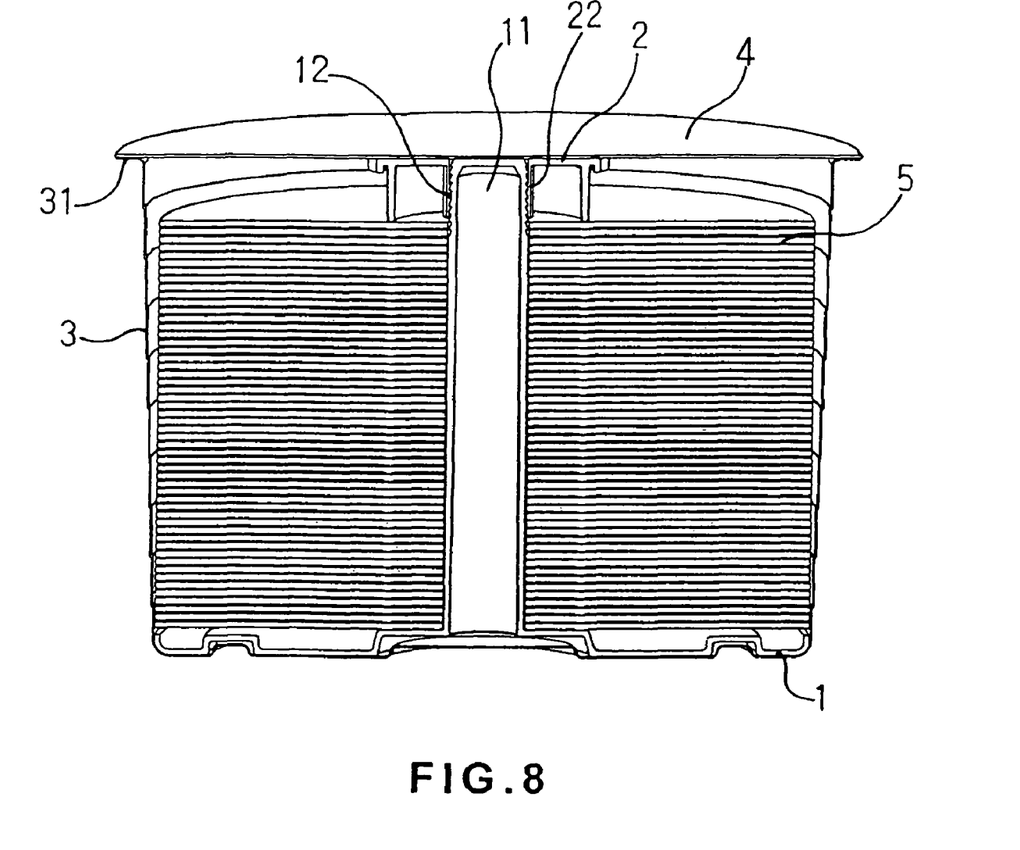
FIG. 8 is a fully assembled sectional view of the CD box structure of the present invention with a plurality of CDs stored therein.

The top cover 4 is closed to the open top of the protective barrel 3 for fitly bearing on and heat sealing to the flange 31, so as to package the seat 1 and the stacked CDs 5 in the protective barrel 3 and the top cover 4.

A manufacturer can stack the CDs 5 on the seat 1 around the central post 11, then, position the seat 1 and the stacked CDs 5 in the protective barrel 3 from the open top thereof, and finally heat seal the top cover 4 to the flange 31 of the protective barrel 3 to complete packaging of the CDs 5 for sale as a finished product. The CDs 5 stacked on the seat 1 and packaged in the protective barrel 3 and the top cover 4 can be well stored and protected against not only dust, but also scratches possibly caused by vibration.

Figure 4:
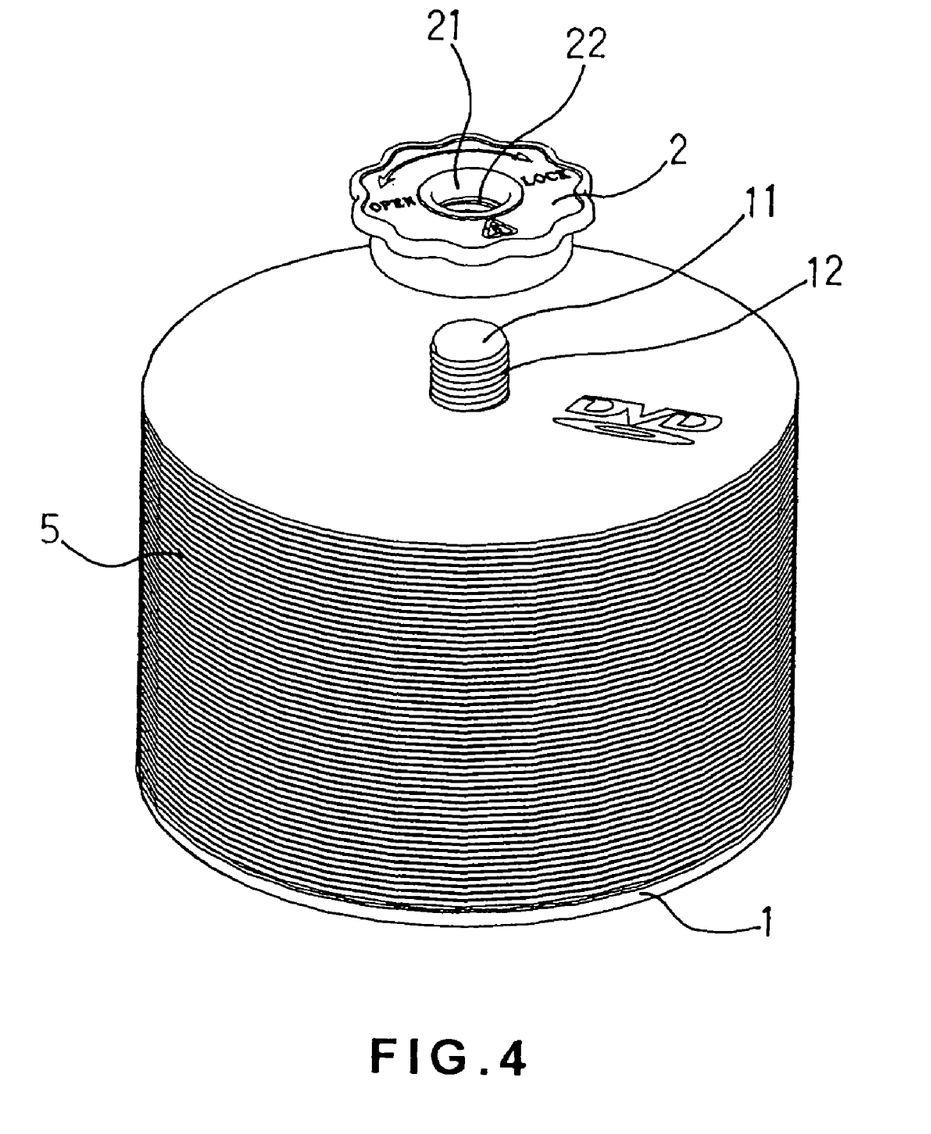
FIG. 4 shows the seat of FIG. 3 with a plurality of CDs stacked thereon.
Figure 5:
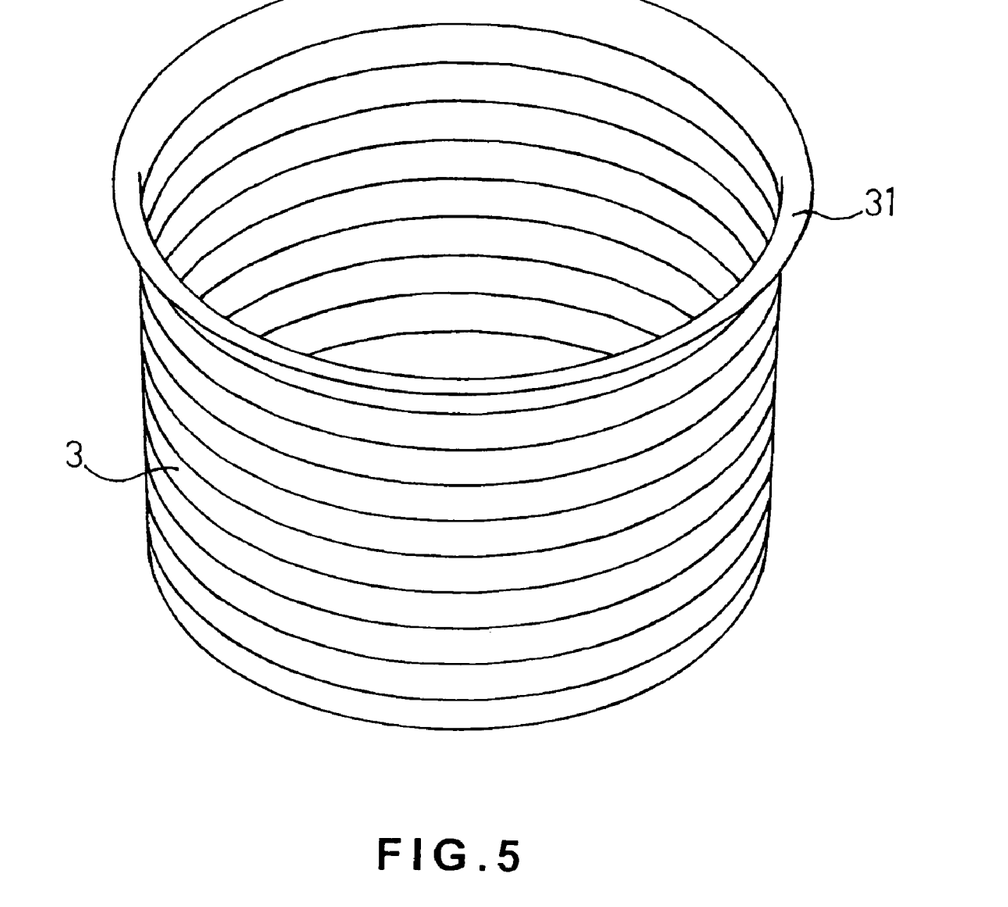
FIG. 5 is a perspective view of a protective barrel included in the CD box structure of the present invention.
Figure 6:
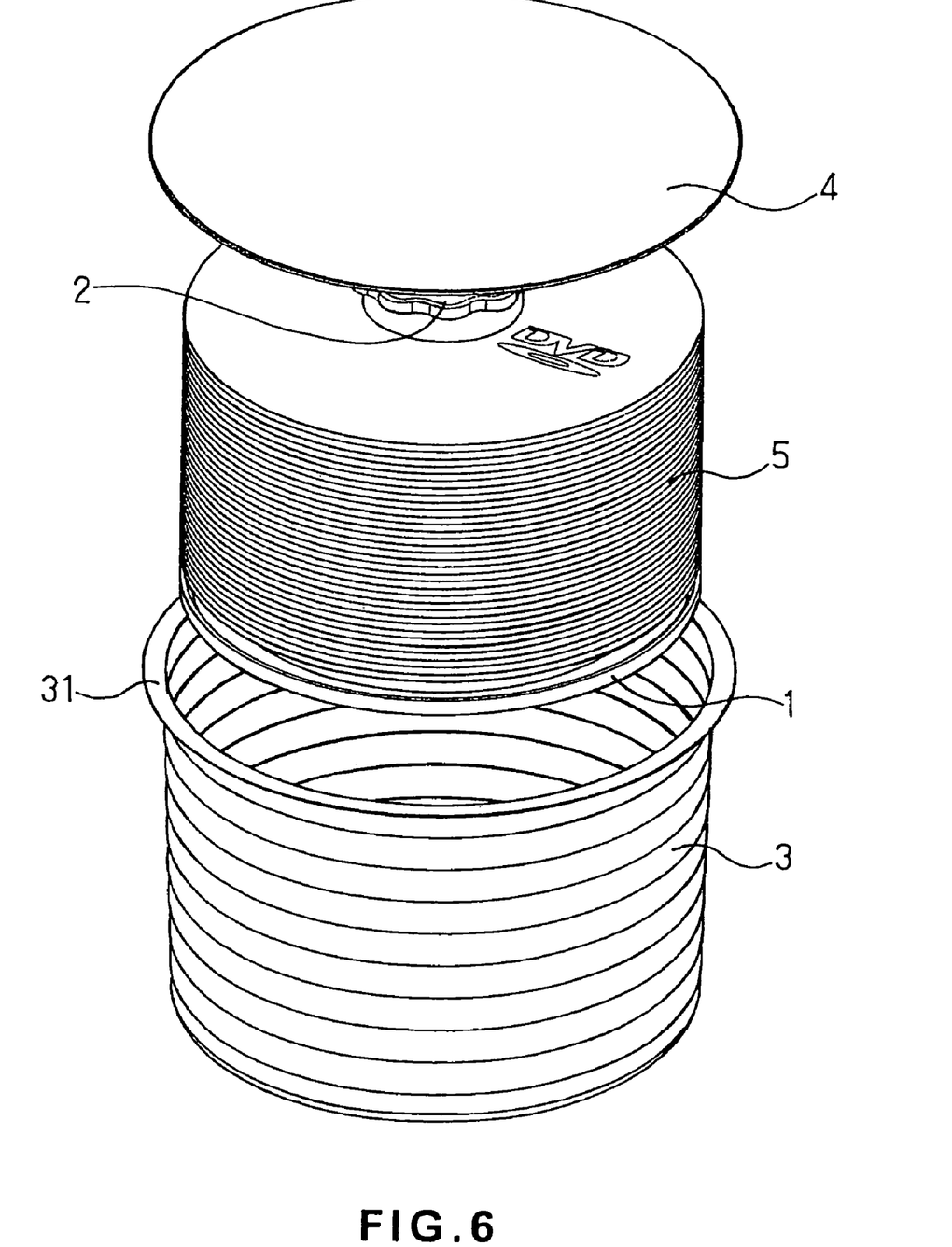
FIG. 6 is a partially exploded perspective view showing the seat with stacked CDs before being received in the protective barrel of FIG. 5.

More specifically, as shown in FIGS. 3 and 4, the CDs 5 are stacked on the seat 1 along the upward extended central post 11. When a predetermined number of CDs 5 has been stacked, the knob 2 is screwed to the upper end of the central post 11 to mesh the internal threads 22 in the hollow column 21 of the knob 2 with the external threads 12 on the upper end of the central post 11. The knob 2 can have an outer periphery formed of successive curved segments or other shapes to provide increased friction, so that the knob can be more easily gripped and turned.

Please refer to FIGS. 5 to 8. The protective barrel 3 is also commonly referred to as a blister and can be made of a polyethylene terephthalate (PET) material. The protective barrel 3 is a cylindrical container having a closed bottom and an open top. The seat 1 with CDs 5 stacked thereon can be fitly received in the protective barrel 3. The top cover 4 is also made of the PET material, and can be closed to the open top of the protective barrel 3 and connected to the flange 31 around the open top of the protective barrel 3 by way of high-frequency heating or heat-melting to seal the open top of the protective barrel 3. The CDs 5 stored in the sealed protective barrel 3 and top cover 4 can be well protected against not only dust, but also undesirable scratches possibly cause by vibration.

The stacking of the CDs 5 on the seat 1 around the central post 11, the screwing of the knob 2 to the central post 11, and the connecting of the top cover 4 to the open top of the protective barrel 3 all can be proceeded on a production line through automated operation to enable largely reduced manufacturing cost of packaging the CDs. The present invention has been described with a preferred embodiment thereof and it is understood that many changes and modifications in the described embodiment can be carried out without departing from the scope and the spirit of the invention that is intended to be limited only by the appended claims.

What is claimed is:

1. A compact disk (CD) box structure, comprising:
   a seat having an upward extended central post and a plurality of CDs stacked on the seat around the central post; and section at an upper end of the central post provided with external threads;
   a knob formed at a center with a downward extended hollow column, and an inner wall surface of the hollow column provided with internal threads meshing with the external threads at the upper end of the central post on the seat;
   a protective barrel being a cylindrical container having a closed bottom and an open top receiving the seat, the stacked CDs therein, and the knob screwed onto said section of said post, and a radially outward extended flange formed along the open top of the protective barrel; and
   a top cover being closed on the open top of the protective barrel for fitly bearing on and heat sealed to the flange;
   whereby the CDs are stacked on the seat around the central post, the knob is screwed to the upper end of the central post to immovably hold the stacked CDs on the seat, so that the seat and the CDs are stacked thereon and are received in the protective barrel, and the top cover is heat sealed to the radially outward extended flange to complete packaging and storing of the CDs in the sealed protective barrel and top cover, protecting the CDs against dust and scratches caused by vibration.

2. The CD box structure as claimed in claim 1, wherein the top cover is heat sealed to the flange of the protective barrel in a manner selected from the group consisting of high-frequency heating and heat melting.

\* \* \* \* \*